United States Patent
Ota et al.

(10) Patent No.: US 6,369,581 B1
(45) Date of Patent: Apr. 9, 2002

(54) METHODS OF CALLING AND TURNING OFF FAILURE CODES

(75) Inventors: Atsuo Ota; Toshiya Nagatsuyu, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/429,076

(22) Filed: Oct. 29, 1999

(30) Foreign Application Priority Data

Oct. 29, 1998 (JP) .......................................... 10-308689

(51) Int. Cl.[7] ......................... G01R 31/00; G01M 17/00
(52) U.S. Cl. ....................... 324/537; 324/503; 702/114; 340/438; 701/29
(58) Field of Search ................................ 324/537, 503, 324/500, 507, 512; 701/29, 31, 35; 702/58, 59, 114; 340/639, 638, 644, 438; 361/41

(56) References Cited

U.S. PATENT DOCUMENTS

| | | | | |
|---|---|---|---|---|
| 3,849,759 A | * | 11/1974 | Hosaka et al. | 340/438 |
| 4,290,060 A | * | 9/1981 | Eppley | 340/638 |
| 5,530,360 A | * | 6/1996 | Kerchaert et al. | 324/379 |
| 6,134,488 A | * | 10/2000 | Sasaki et al. | 701/31 |
| 6,275,058 B1 | * | 8/2001 | Lunde et al. | 324/765 |

FOREIGN PATENT DOCUMENTS

JP          A471955          3/1992

* cited by examiner

Primary Examiner—Safet Metjahic
Assistant Examiner—Anjan K Deb
(74) Attorney, Agent, or Firm—Birch, Stewart, Kolasch & Birch, LLP (57) ABSTRACT

To enable calling and turning off of failure codes stored in a control unit without using a dedicated switch or the like. An electronic control unit controls an actuator of a braking device, stores failure codes representing problems in the braking device, and has its power terminal connected to a battery via a fuse. A main switch is turned on to connect the power terminal to the battery. Thereafter, the fuse is made inoperative or detached, and is re-installed after a lapse of a predetermined time interval. A failure code stored in the electronic control unit is called, and is displayed by an indicator. Then, the fuse is again made inoperative or detached, and re-installed in the predetermined time interval. The failure code will be automatically turned off. Alternatively, a connector may be used to substitute for or in combination with the fuse.

18 Claims, 5 Drawing Sheets

METHODS OF CALLING AND TURNING OFF FAILURE CODES

BACKGROUND OF THE INVENTION

1. Field of the Invention

This invention relates to methods of calling and turning off failure codes stored in a control unit.

2. Description of Background Art

A failure alarming device that notifies a rider or driver of the failure of a braking device by operating an alarm unit is known, for example, in Japanese Patent Laid-Open No. Hei 4-71955.

Further, there is a failure alarming device which alerts not only a failure of the braking device but also the kind of failure on an indicator in order to urge the rider or driver to repair the braking device. In such an alarming device, a memory stores a plurality of failure codes representing various kinds of failures. An appropriate failure code is called from the memory by operating a switch and is displayed on an indicator. In some failure alarming devices, a calling unit is connected to the memory via a connector in order to display a failure code.

In the foregoing alarming devices, a switch must be operated or a calling unit has to be connected when calling and indicating stored failure codes. Use of a dedicated switch or calling unit means an increase in the number and cost of components.

SUMMARY AND OBJECTS OF THE INVENTION

This invention has been conceived in order to overcome the problems of the related art, and to provide methods of calling and turning off failure codes without using a dedicated switch, calling unit or turning-off unit.

In order to accomplish the foregoing object of the invention, according to a first aspect of the invention, there is provided a method of calling failure codes, in which a command for calling a failure code is issued to a control unit by detaching and attaching, in a predetermined sequence, fuses or connectors provided between power supply lines for connecting a battery and power terminals of the control unit. The control unit stores failure codes representing a plurality of failures.

Stored failure codes can be called from the control unit by issuing a command thereto simply by detaching and attaching fuses or connectors disposed between the power supply terminals of the control unit and the battery. Neither a dedicated switch nor calling unit is required, which results in a reduction in the number and cost of components.

In accordance with a second aspect of the invention, there is provided a method of turning off failure codes, in which a command for turning off a failure code is issued to a control unit by detaching and attaching, in a predetermined sequence, fuses or connectors provided between power supply lines for connecting the battery and power terminals of the control unit. The control unit stores failure codes representing a plurality of failures.

Called failure codes can be turned off by issuing a command thereto simply by detaching and attaching fuses or connectors disposed between the power supply terminals of the control unit and the battery. Neither a dedicated switch nor turning-off unit is required, which results in a reduction in the number and cost of components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will be described with reference to preferred embodiments shown in the accompanying drawings.

Figure 1:
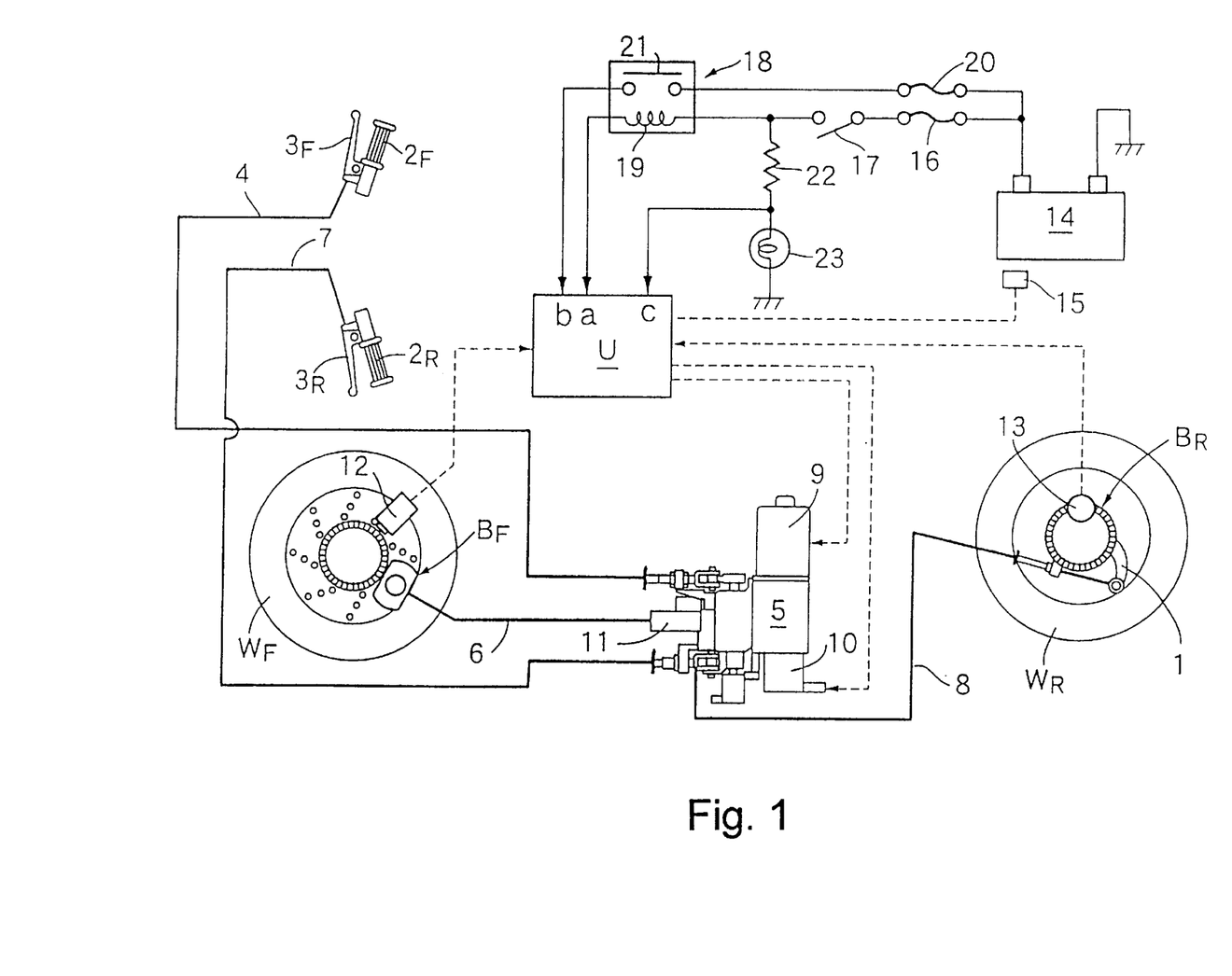
FIG. 1 shows the overall configuration of the braking device for a motorcycle.

Referring to FIG. 1, a motorcycle includes a front wheel $W_F$ that is provided with a front disc brake $B_F$ which is operated hydraulically, and a rear wheel $W_R$ includes a rear mechanical brake $B_R$ which applies braking force in accordance with an operation amount of an operation lever 1. Handgrips $2_F$ and $2_R$ are positioned at opposite ends of a steering handlebar. A first brake lever $3_F$ is operatively supported at the right end of the handlebar, and is operated by the rider's right hand holding the handlebar. Further, a second brake lever $3_R$ is operatively supported at the left end of the handlebar, and is operated by the rider's left hand holding the handlebar.

The first brake lever $3_F$ is connected to the front brake $B_F$ via a brake cable 4, an actuator 5 and brake piping 6. The second brake lever $3_R$ is connected to the rear brake $B_R$ via a brake cable 7, the actuator 5 and a brake cable 8. The actuator 5 is operated by a motor 9 and an electromagnetic brake 10, and transmits hydraulic braking pressure, generated in a master cylinder 11, to the front brake $B_F$ via the brake piping 6, and also mechanically operates the rear brake $B_R$ via the brake cable 8.

The motor 9 and the electromagnetic brake 10 for operating the actuator 5 are controlled by an electronic control unit U, which receives signals from a speed sensor 12 for detecting a rotational speed of the front wheel $W_F$, a speed sensor 13 for detecting a rotational speed of the rear wheel $W_R$ and a battery voltage sensor 15 for detecting a voltage of a 12 volt battery 14.

The battery 14 has its negative terminal grounded and its positive terminal connected to a terminal "a" of the electronic control unit U via a fuse 16, a main switch 17 and a relay coil 19 of a fail safe relay 18, all of which are arranged in series. Further, the positive terminal is connected to a terminal "b" of the electronic control unit U via a fuse 20 and a relay contact 21 of the fail safe relay 18 which are arranged in series. A section between the main switch 17 and the fail safe relay 18 is grounded via a resistor 22 and an indicator 23 which are arranged in series. The section between the resistor 22 and the indicator 23 is connected to a terminal "c" of the electronic control unit U. In this embodiment, the indicator 23 is constituted by a light emitting member such as a lamp or LED.

When the main switch 17 is turned on, the relay coil 19 of the fail safe relay 18 is energized in order to close the relay contact 21, so that a potential at the terminal c becomes 12 volts (i.e. a battery voltage). As a result, power is supplied to the electronic control unit U, thereby allowing the operation of the actuator 5 and illumination of the indicator 23.

In response to rotational speed signals input from the front and rear wheel speed sensors 12 and 13, the electronic control unit U operates the actuator 5. When either the front wheel $W_F$ or the rear wheel $W_R$ appears likely to lock, the electronic control unit U executes an anti-lock braking system (ABS) control by reducing the braking force of the front brake $B_F$ or the rear brake $B_R$ thereby overcoming the locking tendency of the front wheel $W_F$ or the rear wheel $W_R$. The actuator 5 combines the operation of the first and second brake levers $3_F$ and $3_R$ in order to execute synchronized brake system control in which the front and rear brakes $B_F$ and $B_R$ are operated.

Further, the electronic control unit U executes a fault diagnosis for the braking device on the basis of the wheel speed signals input by the front and rear wheel speed sensors 12 and 13, and a battery voltage signal representing a battery voltage detected by the battery voltage sensor 15.

The electronic control unit U executes a fault diagnosis for the braking device as described hereinafter.

The electronic control unit U detects a problem in the braking device on the basis of a battery voltage $V_{BATT}$ detected by the battery voltage sensor 15, and the front wheel speed $V_F$ and the rear wheel speed $V_R$ detected by the front and rear wheel speed sensors 12 and 13. Specifically, if the battery voltage $V_{BATT}$ is below a threshold value, the electronic control unit U detects a problem represented by the failure code "1." If a difference between the front wheel speed $V_F$ and the rear wheel speed $V_R$, is equal to or larger than a threshold value for a predetermined period of time or longer, the electronic control unit U detects a problem represented by the failure code "2." If a slip ratio derived on the basis of the front wheel speed $V_F$ and the rear wheel speed $V_R$ remains equal to or larger than a threshold value, the electronic control unit U detects a problem represented by the failure code "3." These failure codes "1", "2" and "3" are stored in an $E^2$ P-ROM of the electronic control unit U, which causes the indicator 23 to blink in order to notify the rider of a problem in the braking device. The data in the $E^2$P-ROM are electrically writable and erasable, and can be maintained even after the electronic control unit U is switched off.

The indicator 23 blinks in accordance with a called failure code only in order to alert the rider of the presence of a problem in the braking device but not to indicate the nature of a problem (i.e. the failure codes). The indicator 23 normally blinks at equal intervals as shown in FIG. 3(A).

In order to have the faulty braking device repaired, the failure code stored in the $E^2$ P-ROM of the electronic control unit U is recalled at a repair shop or the like and displayed by the indicator, thereby enabling the rider or a repair person to know the cause of the problem as promptly as possible.

Figure 3:
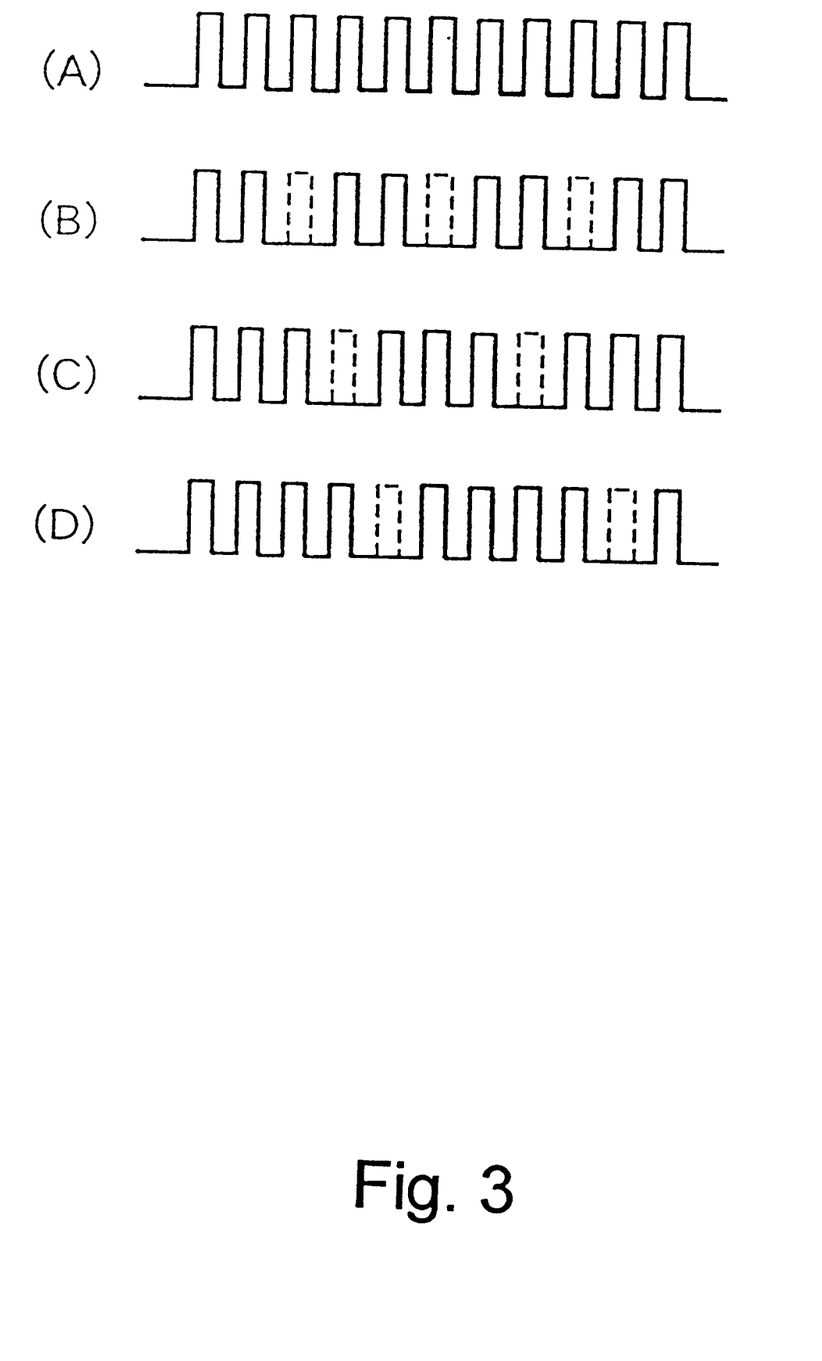
FIGS. 3(A) to 3(D) show blinking modes of the indicator blinks.

Specifically, if there is a problem represented by the failure code "1," the indicator 23 blinks twice in succession and skips blinking once (as shown in FIG. 3(B)). With the failure code "2," the indicator 23 blinks three times in succession and skips blinking once (see FIG. 3(C)). In the case of the failure code "3," the indicator 23 blinks four times in succession, and skips blinking once (see FIG. 3(D)). Therefore, only one indicator 23 can display a plurality of failure codes, which is effective in reducing the number of components.

Once the cause of the problem has been made known based on the failure code (stored in the electronic control unit U) shown by the blinking indicator 23, the failure code is turned off.

Figure 2:
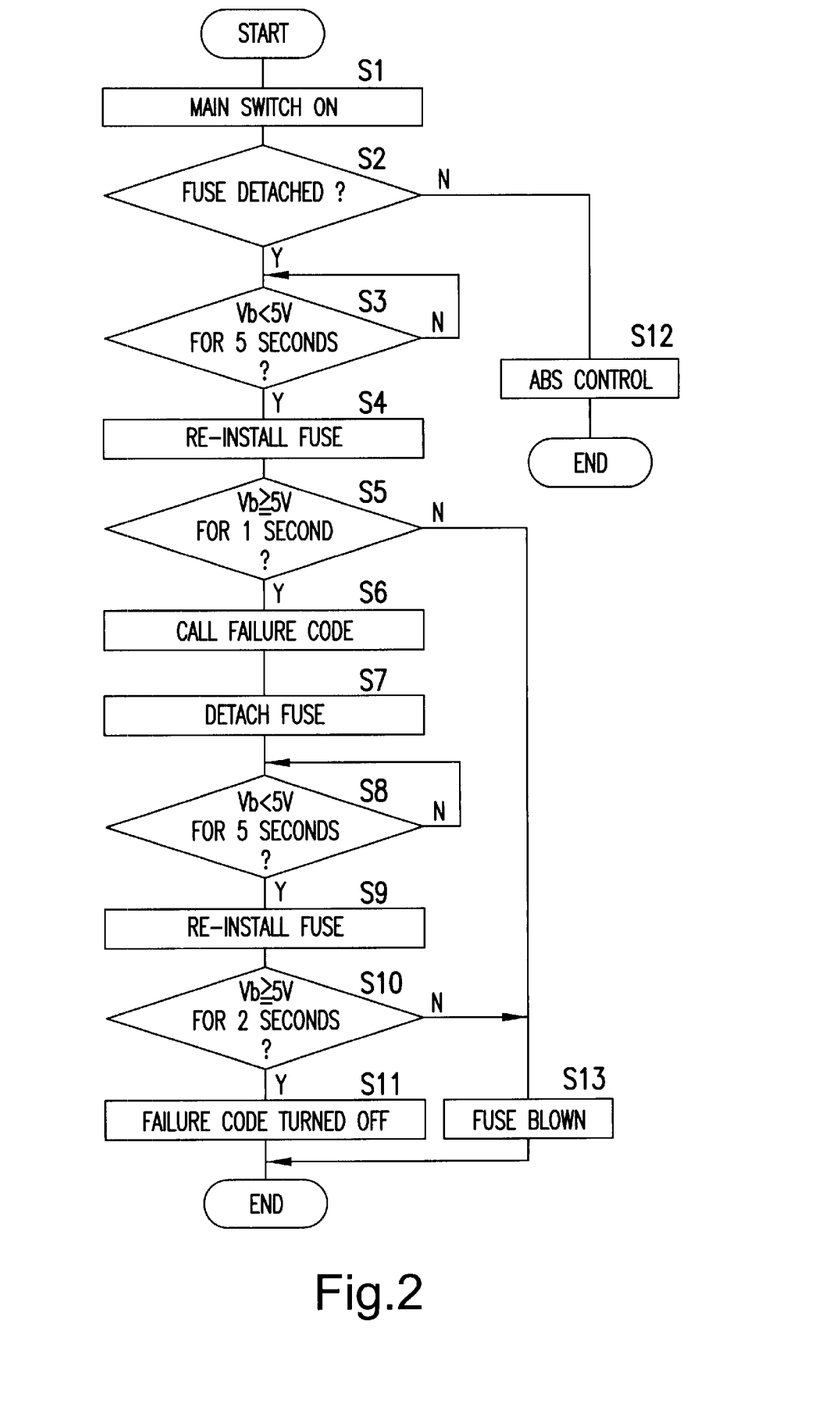
FIG. 2 is a flowchart showing the procedure for calling and turning off the failure codes.

The failure codes stored in the $E^2$ P-ROM will be called and turned off in the following procedure as shown by the flowchart in FIG. 2.

First of all, the main switch 17 is turned on in Step S1. If the fuse 16 connected in series with the main switch 17 has not blown, the relay coil 19 is energized to close the fail safe relay 18. As a result, the terminal b of the electronic control unit U is connected to the battery 14, and the potential at the terminal b becomes 12 volts, which allows a brake control function. Conversely, if the fail safe relay 18 remains open even after the main switch 17 is turned on, the fuse 16 is considered to have blown, and should be replaced.

In Step S2, the fuse 20 connected in series with the relay contact 21 is made inoperative or detached, so that the potential Vb of the terminal b disconnected from the battery 14 is lowered from twelve (12) volts to below five (5) volts (actually 0 volts). If it is not necessary to call and turn off a failure code, and if the fuse 20 is not made inoperative or detached in Step S2, the ABS control process will be executed in Step S12.

When 5 seconds have passed after the fuse 20 has been made inoperative or detached in Step S2, i.e. the potential Vb of the terminal b is maintained below 5 volts for 5 seconds in Step S3, the fuse 20 will be re-installed. If the potential Vb of the terminal b does not become equal to or higher than 5 volts (actually 12 volts) after the fuse 20 has been re-installed in Step S4, the fuse 20 is considered to have blown, and has to be replaced. Conversely, if the potential Vb remains 5 volts or higher for one second in Step S5, a failure code will be automatically called from the $E^2$ P-ROM in accordance with a program stored in a ROM of the electronic control unit U. The indicator 23 will blink in accordance with the called failure code, thereby indicating the nature of the problem.

After calling the failure code in Step 6, the fuse 20 is made inoperative or detached again in Step S7, the terminal b is disconnected from the battery 14, and the potential Vb of the terminal b falls from 12 volts to below 5 volts. In next Step S8, when the potential Vb remains below 5 volts for 5 seconds, the fuse 20 is re-installed in Step S9. As a result, if the potential Vb still does not become equal to or higher than 5 volts, the fuse 20 is considered to have blown, and should be replaced. If the potential Vb remains 5 volts or higher for 2 seconds, the failure code in Step S10 in the $E^2$ P-ROM will be automatically turned off in Step S11 in accordance with a predetermined program stored in the ROM of the electronic control unit U.

As described so far, the failure codes in the $E^2$ P-ROM of the electronic control unit U will be automatically called by re-installing the fuse 20 that has been temporarily made inoperative or detached. The failure codes in the $E^2$ P-ROM are automatically turned off simply by detaching and attaching the fuse 20 once again. Therefore, no dedicated switch, calling unit or turning-off unit is required in order to issue commands to the electronic control unit U, which is effective in reducing the number of components and the manufacturing cost.

A second embodiment of the invention will be described with reference to FIGS. 4 and 5. Specifically, FIG. 4 shows the overall configuration of a braking device for a motorcycle, and FIG. 5 is a flowchart illustrating the procedure for calling and turning off failure codes.

Figure 4:
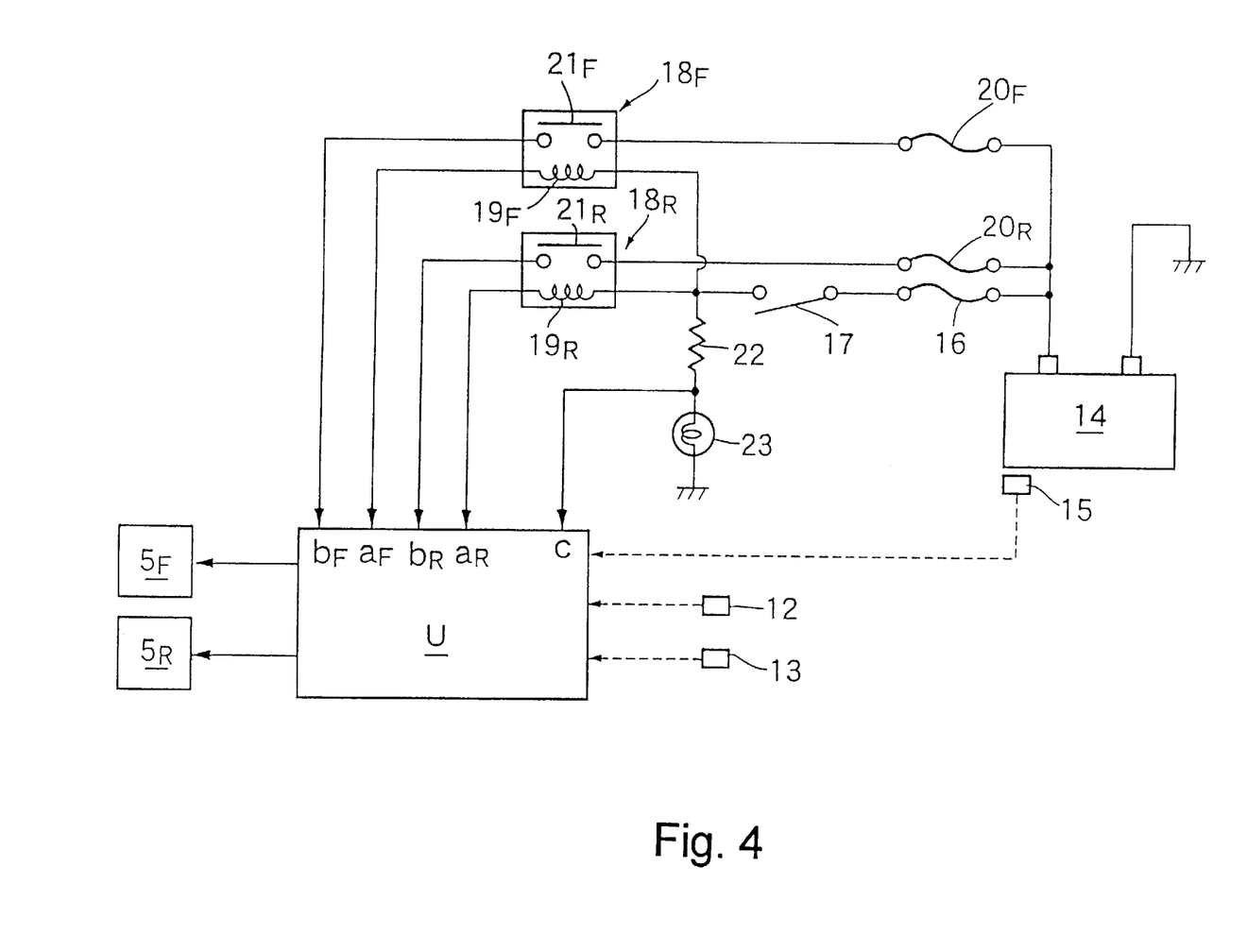
FIG. 4 shows the overall configuration of the braking device for a motorcycle according to the second embodiment of the present invention.

Referring to FIG. 4, the braking device of the second embodiment includes a front actuator $5_F$ for controlling the operation of the front wheel brake $B_F$ and a rear actuator $5_R$ or controlling the operation of the rear wheel brake $B_R$. Two fail safe relays $18_F$ and $18_R$ are arranged in parallel between the battery 14 and the electronic control unit U in order to separately control the front actuator $5_F$ and the rear actuator $5_R$. When the main switch 17 is turned on, relay coils $19_F$, and $19_R$ of the fail safe relays $18_F$ and $18_R$ are energized to close relay contacts $21_F$ and $21_R$. As a result, the terminal $b_F$ of the electronic control unit U is connected to the battery 14 via a fuse $20_F$, so that the operation control of the front actuator $5_F$ is started. Further, the terminal $b_R$ of the electronic control unit U is connected to the battery 14 via a fuse $20_R$ thereby starting the operation control of the rear actuator $5_R$. The remaining configuration of this braking device is identical to that in the first embodiment.

The operation of the second embodiment will be described hereinafter.

Figure 5:
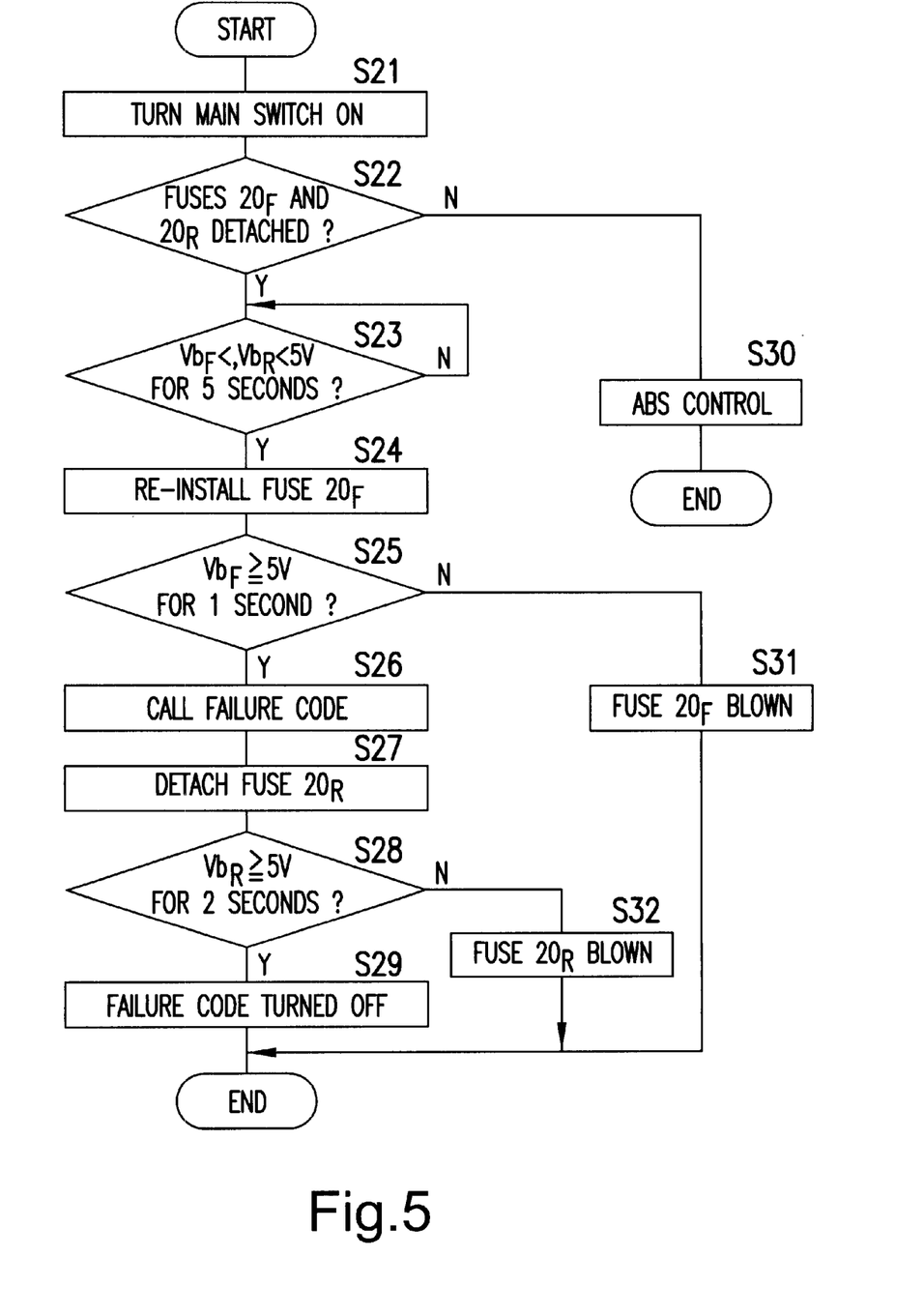
FIG. 5 is a flowchart showing the procedure for calling and turning off the failure codes.

When the indicator 23 blinks at equal intervals in order to bring attention to a problem in the braking device, a failure code in the $E^2$ P-ROM of the electronic control unit U will be called and displayed on the indicator 23, and will be turned off in the following procedures as shown in the flowchart of FIG. 5.

First of all, the main switch is turned on in Step 21. In Step S22, the two fuses $20_F$ and $20_R$ corresponding to the two fail safe relays $18_F$ and $18_R$ are made inoperative or detached, so that the terminals $b_F$ and $b_R$ are disconnected from the battery 14, and potentials $Vb_F$ and $Vb_R$ of these terminals become lower than 5 volts (actually 0 volts). Conversely, if the fuses $20_F$ and $20_R$ are not inoperative or detached, the ABS control will be executed in Step S31.

Only one of the inoperative or detached fuses (e.g. the fuse $20_F$) is re-installed in step S24 after the fuses $20_F$ and $20_R$ remain inoperative or detached for 5 seconds in Step S23, i.e. the potentials $Vb_F$ and $Vb_R$ remain lower than 5 volts for 5 seconds. If the potential Vb of the terminal $b_F$ does not become 5 volts or higher (actually 12 volts) in Step S25 after the fuse $20_F$ is re-installed, the fuse $20_F$ is considered to have blown) in Step S31, and is replaced with a new one. On the other hand, if the potential $Vb_F$ of the terminal $b_F$ remains 5 volts or higher for one second in Step S25, the failure code in the $E^2$ P-ROM will be automatically called in accordance with the program stored in the ROM of the electronic control unit U, in Step S26. The indicator 23 blinks in accordance with the called failure code to indicate the content of the problem.

After calling the failure code, the fuse $20_R$ will be re-installed in Step S27. If the potential $Vb_R$ of the terminal $b_R$ does not become 5 volts or higher in Step S28, the fuse $20_R$ is considered to have blown, and will be replaced by a new one. On the other hand, if the potential $Vb_R$ of the terminal $b_R$ remains 5 volts or higher for 2 seconds in Step S28, the failure code in the $E^2$ P-ROM will be automatically turned off in accordance with the program stored in the ROM of the electronic control unit U.

The braking device of the second embodiment is as effective as the braking device of the first embodiment.

Although the invention has been described with reference to the exemplary preferred embodiments, various modifications and changes of the invention can be readily made without departing from the spirit of this invention.

For instance, the fuses 20, $20_F$ and $20_R$ may be replaced with connectors which can disable the connection between the battery 14 and terminals b, $b_F$ and $b_R$ of the electronic control unit U. Needless to say, the connectors may be used independently or in combination with fuses.

In the foregoing embodiments, the failure codes are both called and turned off. Alternatively, they may be either called or turned off. The present invention is applied to the control unit for the braking device, but is applicable to control units for any other devices.

The kinds of failure codes and the blinking intervals of the indicator 23 can be determined as desired. In the foregoing embodiments, the indicator 23 is a light emitting member such as a lamp or an LED, but may be realized by any sound emitting member such as a buzzer. Alternatively, the failure codes may be visibly displayed on a monitor by characters or images.

As set forth in the present invention, it is possible to call the failure codes in the control unit simply by detaching and attaching fuses or connectors arranged between the power terminals of the control unit and the battery. Therefore, no dedicated switch or calling unit is necessary, which is effective in reducing the number of components and manufacturing cost.

According to the present invention, it is possible to turn off the failure codes simply by detaching and attaching fuses or connectors arranged between the power terminals of the control unit and the battery. Therefore, no dedicated switch or calling or turning-off unit is necessary, which is effective in reducing the number of components and the manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of calling failure codes representing a plurality of braking system failure conditions comprising the following steps:

issuing a command to a control unit for calling a failure code by detaching and attaching, in a predetermined sequence, properly-operating fuses or connectors provided between power supply lines for connecting a battery and power terminals of the control unit which stores failure codes representing a plurality of failures, wherein the control unit outputs a failure code corresponding to the presence or absence of any one of a plurality of failure conditions to an indicator for alerting an operator of the presence or absence of any one of a plurality of failure conditions.

2. A method of tuning off failure codes representing a plurality of braking system failure conditions comprising the following steps:

issuing a command to a control Unit for turning off a failure code by detaching and attaching, in a predetermined sequence, properly-operating fuses or connectors provided between power supply lines for connecting a battery and power terminals of the control unit which stores failure codes representing a plurality of failures, wherein the control unit outputs a failure code corresponding to the presence or absence of any one of a plurality of failure conditions to an indicator for alerting an operator of the presence or absence of any one of a plurality of failure conditions.

3. A method of determining any of a plurality of braking system failure conditions comprising the following steps:

actuating an electrical circuit containing a plurality of fuses and a control unit;

determining if one or more of the plurality of fuses are inoperative;

determining if a voltage in the electrical circuit is less than a predetermined voltage;

installing a properly-operating fuse based on the step of determining if a voltage in the electrical circuit is less than the predetermined voltage;

determining if a voltage in the electrical circuit is greater than a predetermined voltage;

calling a failure code stored in the control unit if the voltage in the electrical circuit is greater than the predetermined voltage;

detaching a fuse based on the failure code;

determining if a voltage in the electrical circuit is less than the predetermined voltage;

installing a fuse based on the step of determining if a voltage in the electrical circuit is less than the predetermined voltage;

determining if a voltage in the electrical circuit is greater than a predetermined voltage; and turning off the failure code in the control unit if the voltage in the electrical circuit is greater than the predetermined voltage, wherein the control unit outputs a failure code corresponding to the presence or absence of any one of a plurality of failure conditions to an indicator for alerting an operator of the presence or absence of any one of a plurality of failure conditions.

4. The method of determining the failure of an electrical circuit according to claim 3, wherein the predetermined voltage is five volts in the first step of determining if a voltage in the electrical circuit is less than the predetermined voltage.

5. The method of determining the failure of an electrical circuit according to claim 4, wherein the first step of determining if a voltage in the electrical circuit is less than the predetermined voltage is conducted for approximately five seconds.

6. The method of determining the failure of an electrical circuit according to claim 3, wherein the predetermined voltage is five volts in the second step of determining if a voltage in the electrical circuit is greater than the predetermined voltage.

7. The method of determining the failure of an electrical circuit according to claim 6, wherein the second step of determining if a voltage in the electrical circuit is greater than the predetermined voltage is conducted for approximately one second.

8. The method of determining the failure of an electrical circuit according to claim 3, wherein the predetermined voltage is five volts in the third step of determining if a voltage in the electrical circuit is less than the predetermined voltage.

9. The method of determining the failure of an electrical circuit according to claim 8, wherein the third step of determining if a voltage in the electrical circuit is less than the predetermined voltage is conducted for approximately five seconds.

10. The method of determining the failure of an electrical circuit according to claim 3, wherein the predetermined voltage is five volts in the fourth step of determining if a voltage in the electrical circuit is greater than the predetermined voltage.

11. The method of determining the failure of an electrical circuit according to claim 10, wherein the fourth step of determining if a voltage in the electrical circuit is greater than the predetermined voltage is conducted for approximately two seconds.

12. A method of determining any of a plurality of braking system failure conditions comprising the following steps:

actuating an electrical circuit containing at least a first brake fuse, a second brake fuse and a control unit;

determining if the first brake fuse or the second brake fuse are inoperative;

determining if a voltage in the electrical circuit connected to the first brake fuse and the second brake fuse is less than a predetermined voltage;

installing a properly-operating first brake fuse based on the step of determining if a voltage in the electrical circuit is less than the predetermined voltage;

determining if a voltage in the electrical circuit connected to the first brake fuse is greater than a predetermined voltage;

calling a failure code stored in the control unit if the voltage in the electrical circuit is greater than the predetermined voltage;

detaching a second brake fuse based on the failure code;

determining if a voltage in the electrical circuit connected to the second brake fuse is greater than the predetermined voltage; and turning off the failure code in the control unit if the voltage in the electrical circuit connected to the second brake fuse is greater than the predetermined voltage, wherein the control unit outputs a failure code corresponding to the presence or absence of any one of a plurality of failure conditions to an indicator for alerting an operator of the presence or absence of any one of a plurality of failure conditions.

13. The method of determining the failure of an electrical circuit connected to a braking system according to claim 12, wherein the predetermined voltage is five volts in the first step of determining if a voltage in the electrical circuit connected to the first and second brake fuses is less than the predetermined voltage.

14. The method of determining the failure of an electrical circuit connected to a braking system according to claim 13, wherein the first step of determining if a voltage in the electrical circuit connected to the first and second brake fuses is less than the predetermined voltage is conducted for approximately five seconds.

15. The method of determining the failure of an electrical circuit connected to a braking system according to claim 12, wherein the predetermined voltage is five volts in the second step of determining if a voltage in the electrical circuit connected the first brake fuse is greater than the predetermined voltage.

16. The method of determining the failure of an electrical circuit connected to a braking system according to claim 15, wherein the second step of determining if a voltage in the electrical circuit connected to the first brake fuse is greater than the predetermined voltage is conducted for approximately one second.

17. The method of determining the failure of an electrical circuit connected to a braking system according to claim 12, wherein the predetermined voltage is five volts in the third step of determining if a voltage in the electrical circuit is greater than the predetermined voltage.

18. The method of determining the failure of an electrical circuit connected to a braking system according to claim 17, wherein the third step of determining if a voltage in the electrical circuit connected to the second brake fuse is less than the predetermined voltage is conducted for approximately two seconds.

* * * * *